US00RE35876E

United States Patent [19]

Mahnad

[11] E Patent Number: Re. 35,876

[45] Reissued Date of Patent: Aug. 25, 1998

[54] TRIAXIAL TRANSMISSION LINE FOR TRANSMITTING TWO INDEPENDENT FREQUENCIES

[76] Inventor: Ali R. Mahnad, 5063 Olive Oak Way, Carmichael, Calif. 95608

[21] Appl. No.: 766,085

[22] Filed: Dec. 16, 1996

Related U.S. Patent Documents

Reissue of:

[64] Patent No.: 5,418,506
Issued: May 23, 1995
Appl. No.: 91,652
Filed: Jul. 14, 1993

[51] Int. Cl.[6] ..... H01P 5/12

[52] U.S. Cl. ..... 333/134; 333/136; 439/580; 455/82; 375/257

[58] Field of Search ..... 333/124–136, 333/1; 439/580, 582; 455/82, 83; 375/257

[56] References Cited

U.S. PATENT DOCUMENTS 4,758,806 7/1988 Mohring et al. ..... 333/135
5,109,232 4/1992 Monte ..... 333/126
5,142,253 8/1992 Mallavarpu ..... 333/136

FOREIGN PATENT DOCUMENTS 0593299 2/1960 Canada ..... 333/126

OTHER PUBLICATIONS

Microwave Transmission Line Data, "Coaxial Line Structures and Transformers", pp. 89–93.

*Primary Examiner*—Robert Pascal
*Assistant Examiner*—Seungsook Ham
*Attorney, Agent, or Firm*—Flehr Hohbach Test Albritton & Herbert LLP

[57] ABSTRACT

A triaxial transmission line provides for the transmission of two independent signals from a transmitter to an antenna utilizing the middle conductor as a portion of the coaxial line for both signals. One signal utilizes the inner and middle conductor and the second signal the outer and middle conductor. The outer conductor at both ends of the triaxial transmission is line is shorted to the middle conductor.

5 Claims, 4 Drawing Sheets

TRIAXIAL TRANSMISSION LINE FOR TRANSMITTING TWO INDEPENDENT FREQUENCIES

Matter enclosed in heavy brackets [ ] appears in the original patent but forms no part of this reissue specification; matter printed in italics indicates the additions made by reissue.

The present invention is directed to a triaxial transmission line for transmitting two independent frequencies and more specifically to a transmission line useful for high definition television (HDTV).

BACKGROUND OF THE INVENTION

Implementation of high definition television (HDTV) in the United States is now undergoing testing by the Federal Communications Commission. It is contemplated that such an HDTV system will require additional channel allocations on UHF frequencies which will carry a digital signal. Thus alterations to existing transmitting antennas will be required. The existing TV signal is normally designated an NTSC signal which is analog. It is contemplated that the HDTV digital signal will be located on the same transmission tower. However because the normal NTSC signal is in the VHF frequency range, such VHF antenna cannot simultaneously serve UHF channels. In such cases, the HDTV operation will require separate antenna which may be in a different location of the tower or preferably in a common antenna aperture.

Normally two separate coaxial feed cables would be utilized for each antenna. This is expensive and cumbersome.

OBJECT AND SUMMARY OF INVENTION

It is therefore a general object of the invention to provide an improved transmission line for feeding two different independent frequency signals to a transmitter antenna.

In accordance with the above object, there is provided a triaxial transmission line having two ends for transmitting two independent and different frequency signals, $f_1$ and $f_2$. It comprises an inner substantially cylindrical conductor having an axis; an outer tubular conductor coaxial with the inner conductor; and a middle tubular conductor coaxial with and between the inner and outer conductors. A coaxial input and output are provided for the signal $f_2$, each coaxial with the conductors at the two ends respectively of the transmission line and including the inner and middle conductors as the active portions of the input and output ports. Coaxial input and output ports for signal $f_2$ are perpendicular to the axis of the inner conductor and respectively positioned near the two ends of the transmission line and include as active portions the outer and middle conductors.

DESCRIPTION OF PREFERRED EMBODIMENTS

Figure 1:
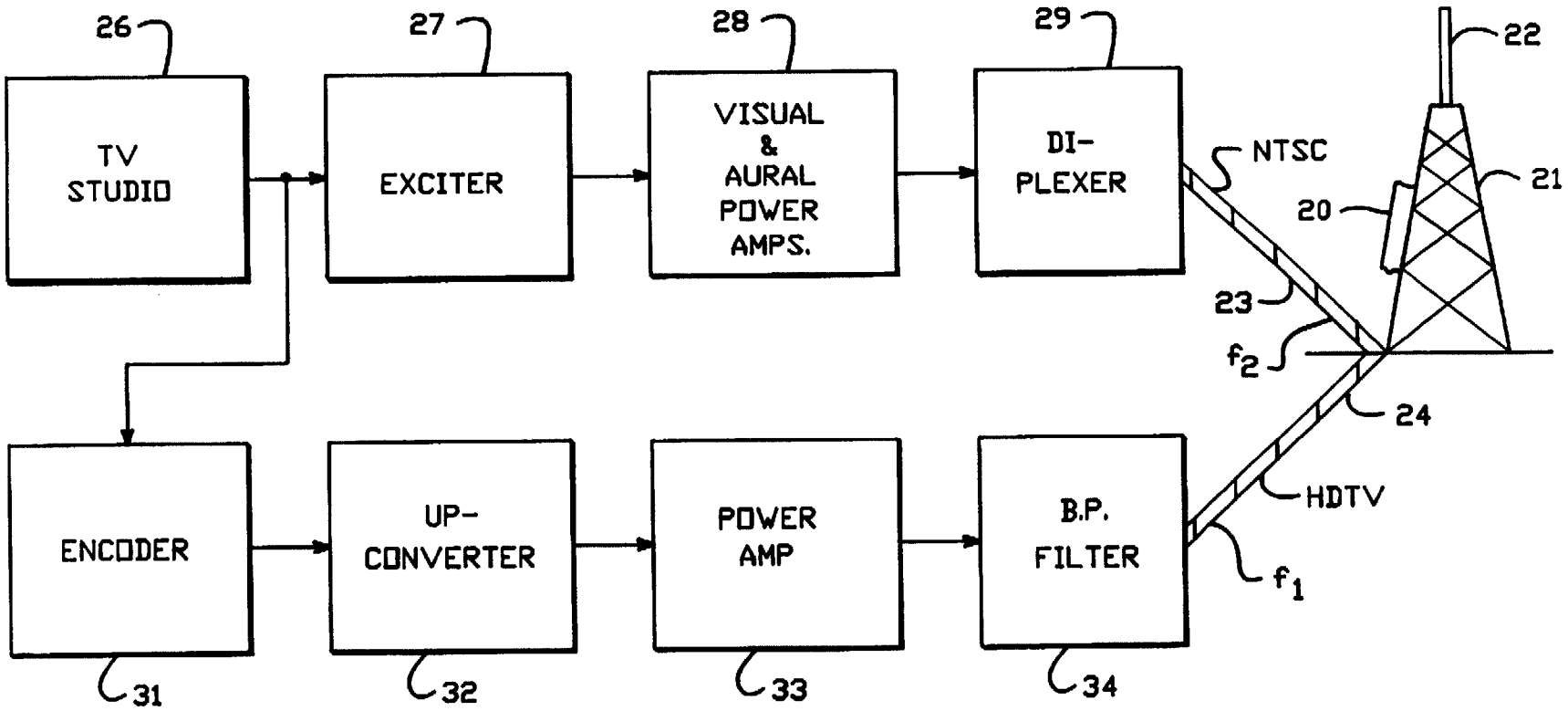
FIG. 1 is a block diagram showing a broadcast antenna and typical drive units for producing a suitable high definition television signal.

FIG. 1 illustrates a proposed HDTV system where the transmission tower 21 which with its antenna on a vertical support mast 22 will radiate or transmit both an NTSC signal, $f_2$, received on the coaxial cable 23 and coupled to the tower and an HDTV signal, $f_1$, on the coaxial cable or waveguide 24. Cables 23 and 24 are both connected to the triaxial transmission line 20 which will feed a pair of antennas (not shown) mounted on mast 22. (See copending application entitled "Dual Frequency Batwing Antenna", Ser. No. 8/084,298, filed Jun. 18, 1994, for one antenna arrangement). In general the NTSC signal can be either in the low VHF or high VHF range which are 54–88 MHz and 170–1230 MHz, respectively. Also such a signal may be in the UHF band which is 470–800 MHz. In general it is contemplated that the extra HDTV channels will be the UHF channels which were used for spacing.

The remainder of FIG. 1 are standard transmitting system blocks. From a television studio 26, one feed extends to an NTSC channel including an exciter 27, visual and aural power amplifiers 28 and a combining diplexer 29 which feeds the coaxial waveguide 23.

The second channel from the TV studio 26 includes the encoder 31 to convert the information to digital, an upconverter 32, power amplifier 33, and a band pass filter 34 connecting to the HDTV coaxial 24. The HDTV signal as well as being digital is contemplated to be of the spread spectrum type.

Figure 2:
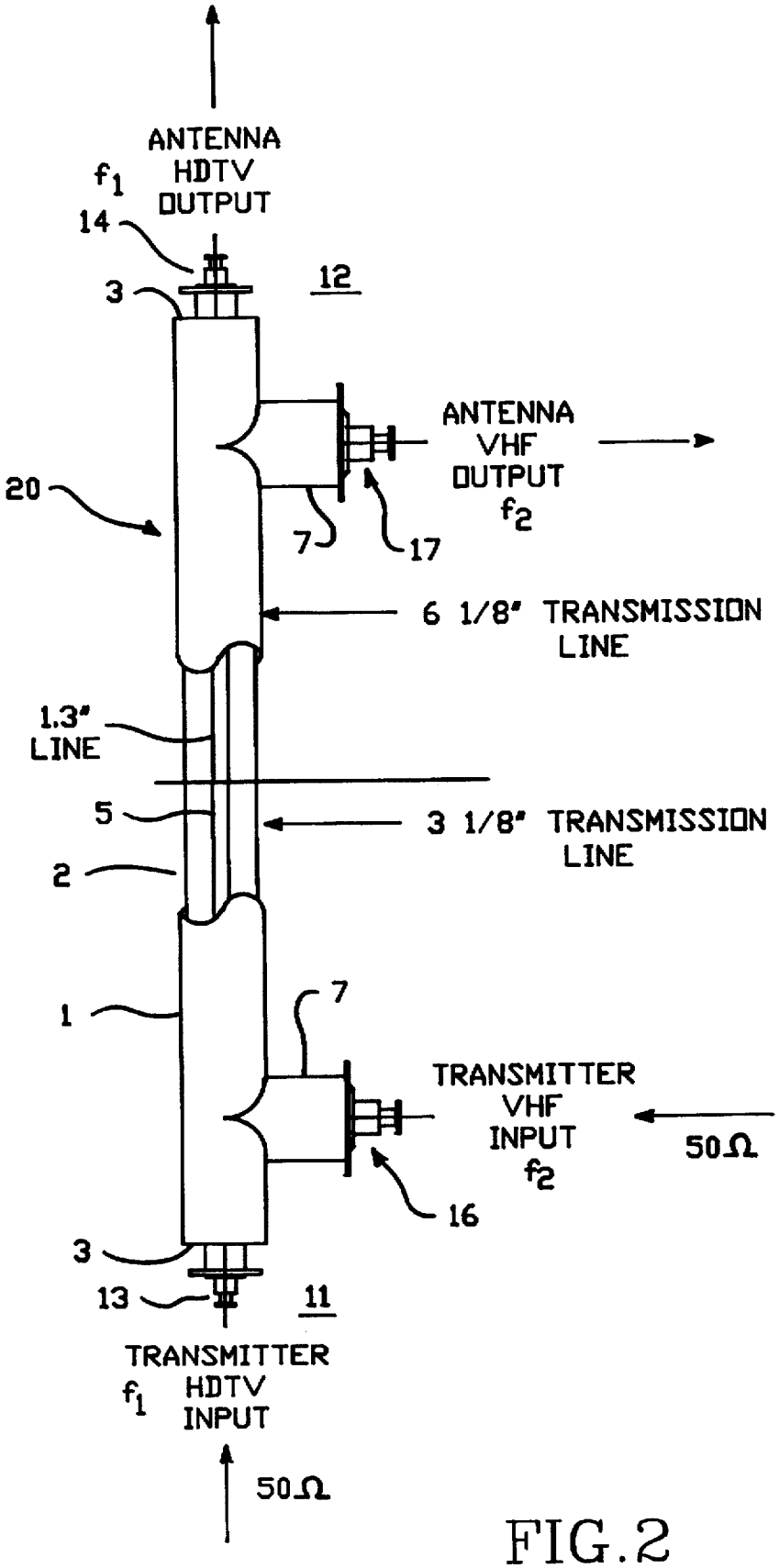
FIG. 2 is a simplified side view partially sectioned of a triaxial transmission line embodying the present invention.

FIG. 2 illustrates in detail the triaxial transmission line 20 of the present invention which carries two completely independent signals; $f_1$, the HDTV signal, and $f_2$, the VHF signal, from the transmitter to the antenna. And rather than use two separate coaxial cables for waveguides, only a single relatively simple triaxial structure is necessary.

As illustrated in FIG. 2, line 20 includes an outer conductor 1, an inner conductor 5, and a middle conductor 2. All of the conductors are essentially tubular. The triaxial transmission line has a transmitter end 11 and an antenna end 12 located on the mast 12. For convenience, the outer conductor 1 is of a standard dimension which in this particular case is 6⅛". And this is true of the middle conductor 2 which is 3⅛". The diameter of the inner conductor 5 is thus chosen to be approximately 1.3" so that the characteristic impedance, $Z_o$, provided by the coaxial line for the input and output ports 13, 14 for $f_1$, the HDTV signal, is 50 ohms. This is determined by the following formula:

$$Z_o=138 \log [D_o/D_{in}]$$

where $D_o$ and $D_{in}$ are the inside and outside diameter of the coaxial line 2, 5. However with the use of a 3⅛ middie transmission line 2, to provide a 50-ohm characteristic impedance for the input and output terminals 16 and 17 of the $f_2$ signal, the diameter of outer conductor 1 would have to be of a non standard dimension of over 7".

Figure 3:
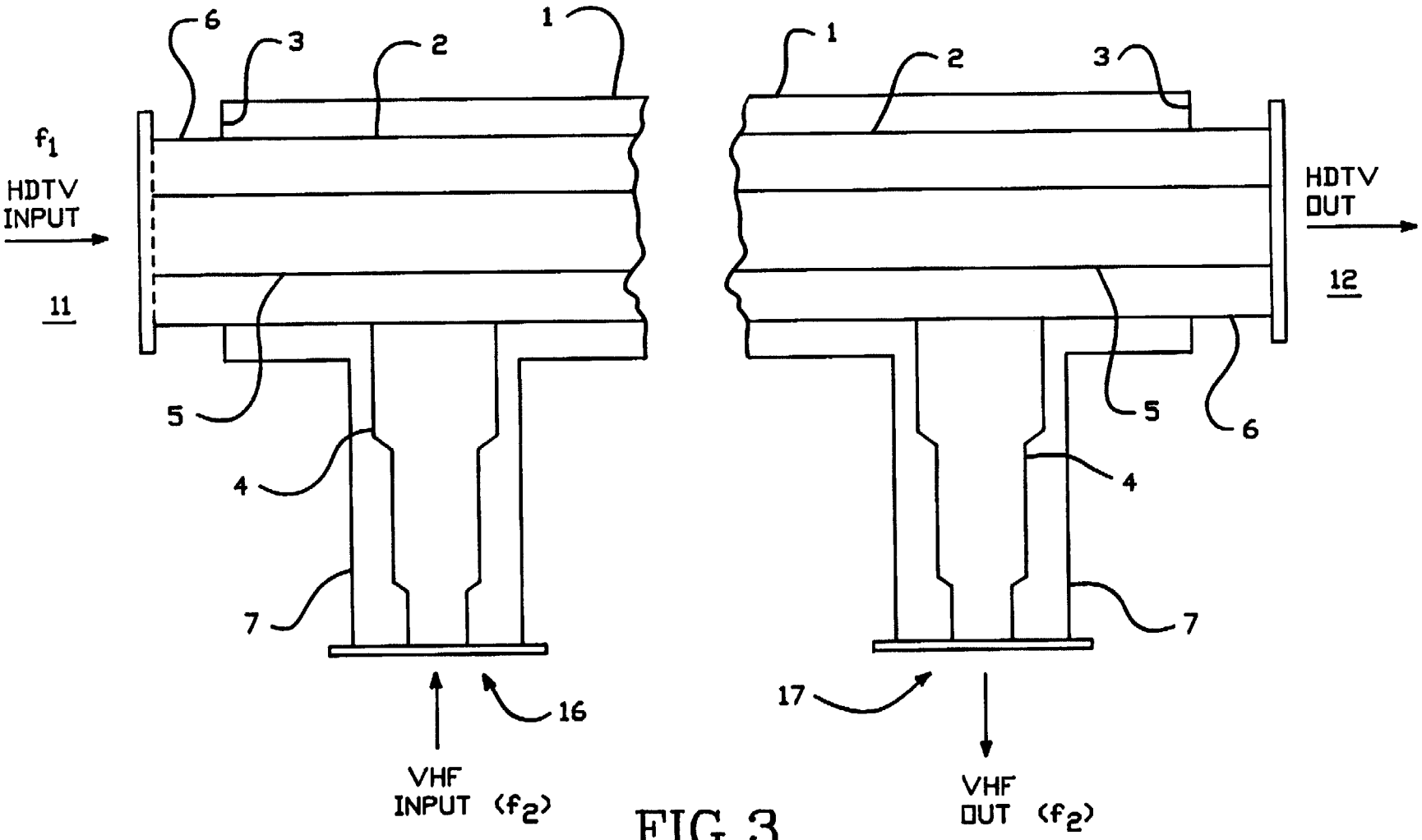
FIG. 3 is a more schematic representation of FIG. 2.
Figure 4:
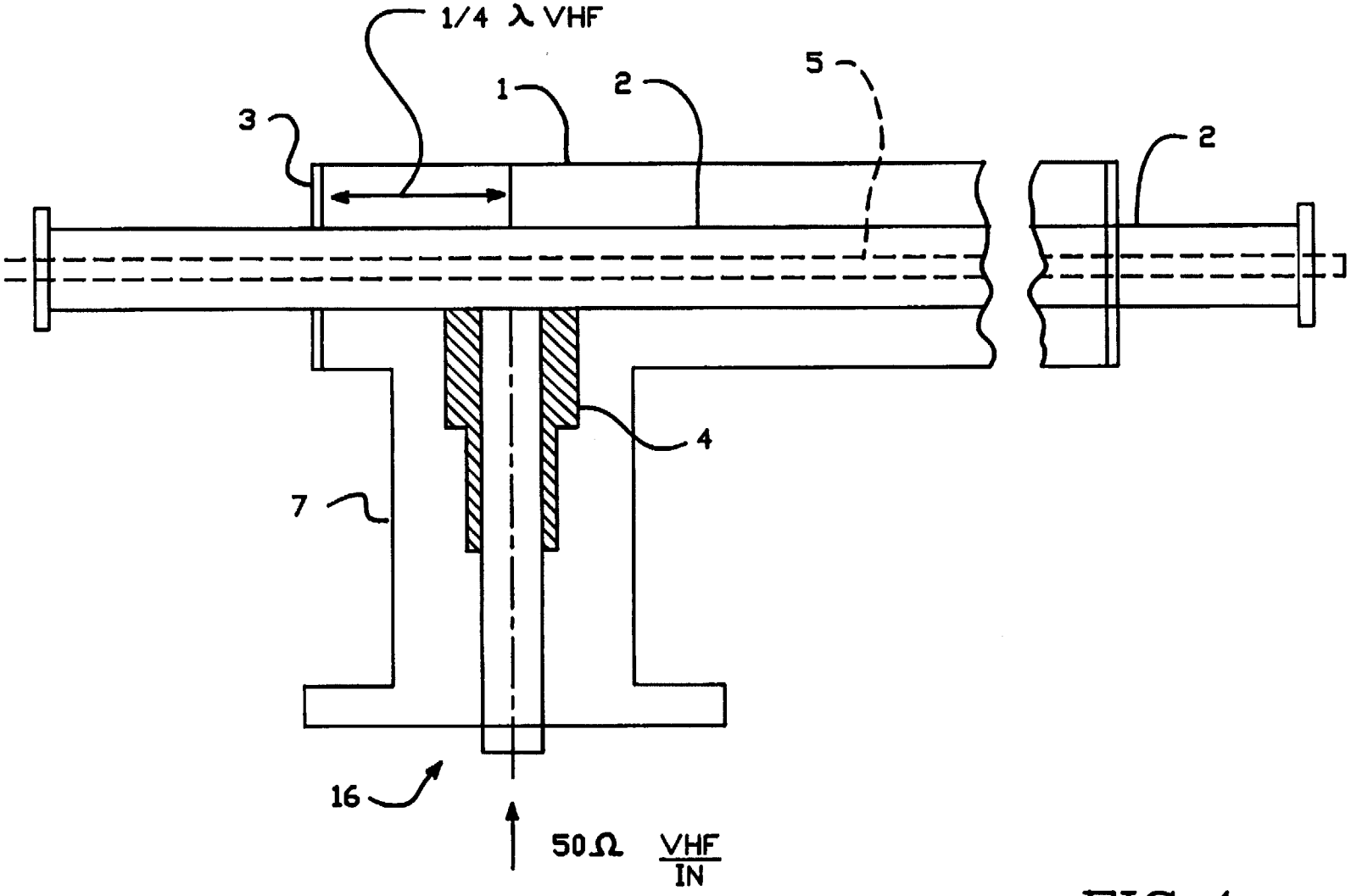
FIG. 4 is an enlarged detail of a portion of FIG. 3.

In order to accommodate a standard dimension of outer conductor 1, as best illustrated in FIGS. 3 and 4, the VHF ports or $f_2$ ports 16 and 17 include a stepped conductor 4 which is interior to the outer conductor 7. Conductor 7 is of the same diameter as outer conductor 1 and meshes with it as illustrated in FIG. 2. The stepped construction 4 which provides an enlarged portion of the inner conductor relative to the diameter of middle conductor 2 serves as a matching transformer. It also serves to fine tune the overall ports 16 and 17. Thus the impedance of conductors 1, 2 is modified to the desired standard characteristic impedance for the $f_2$ ports of 50 ohms.

In order to insure that the outer conductor 1 shields middle conductor 2, shorting rings 3 (see FIG. 4) ground the outer conductor 1 to the middle conductor 2 at a location which is substantially ¼ wavelength (with regard to the VHF frequency $f_2$) from the center line of the perpendicular coaxial port 16. And the same is true of the output end of the triaxial line. In fact the input and output ends, as illustrated in both FIGS. 2 and 3, are identical in construction. As shown, rings 3 being located at the ¼ wavelength distance is most suited to broadband match the coaxial line 1, 2. At the same time the transformer 4 is designed to broadband match to the coaxial line 1, 2 to the input impedance of 50 ohms for the input port 16.

FIG. 4 is an enlarged detail of the input ends of FIG. 3 illustrating the ¼ wavelength shorting by rings 3 and the construction of stepped conductor 4.

Thus, in summary, with the triaxial line of the present invention, the middle conductor 2 of the triaxial is effective as the inner conductor of the $f_2$ coaxial line and as the outer conductor of the $f_1$ coaxial line. And both signals which are completely independent of each other, and of course of significantly different frequencies as discussed above, are transmitted without interference in the same simple structure. Thus an improved transmission line for a television antenna has been provided which is especially useful for high definition television where two completely independent signals are transmitted over a triaxial line.

What is claimed:

1. A triaxial transmission line having two ends for transmitting two independent and different frequency signals $f_1$ and $f_2$, from two transmitter channels at one end respectively to two antennas, one for each signal at the other end, comprising:

an inner substantially cylindrical conductor having an axis;

an outer tubular conductor coaxial with said inner conductor;

a middle tubular conductor coaxial with and between said inner and outer conductors;

coaxial input and output ports for said signal $f_1$ for respective connection to one of said transmitter channels and one of said antennas, each coaxial with said conductors at said two ends respectively of said transmission line and including said inner and middle conductors as the active portions of said ports;

coaxial input and output ports for said signal $f_2$ for respective connection to the other of said transmitter channels and the other of said antennas, each perpendicular to said axis of said inner conductor and respectively positioned near said two ends of said transmission line and including as active portions said outer and middle conductors whereby two independent and isolated signal paths for $f_1$ and $f_2$ are respectively provided by said triaxial transmission line from said transmitter channels to said respective antennas.

2. A transmission line as in claim 1 including shorting ring means for conductively shorting said outer to said middle conductor near said ends at a distance substantially one quarter wavelength, with respect to said frequency $f_2$, from said $f_2$ coaxial ports.

3. A triaxial transmission line, as in claim 1 where said $f_2$ ports each include a stepped coaxial conductor connected to said middle conductor to transform the impedance to said outer and middle conductors to the desired characteristic impedance of said $f_2$ ports.

4. A triaxial transmission line as in claim 1 where the diameter of the middle conductor is chosen with respect to the diameter of said inner conductor to match the desired characteristic impedance of said $f_1$ ports.

*5. A triaxial transmission line having two ends for transmitting two independent and different frequency signals $f_1$ and $f_2$ from two transmitter channels at one end respectively to two antennas, one for each signal, at the other end, comprising:*

*an inner substantially cylindrical conductor having an axis;*

*an outer tubular conductor coaxial with said inner conductor;*

*a middle tubular conductor coaxial with and between said inner and outer conductors;*

*a coaxial input port for said signal $f_1$, for connection to one of said transmitter channels, coaxial with and connected at said one end and including as active portions said inner and middle conductors, said inner and middle conductors transmitting said signal $f_1$ to one of said antennas at said other end of said transmission line;*

*a coaxial input port for said signal $f_2$, for connection to the other of said transmitter channels, perpendicular to said axis of said inner conductor and positioned near said one end of said transmission line and connected to and including as active portions said outer and middle conductors, said outer and middle conductors transmitting said signal $f_2$ to the other of said antennas at said other end of said transmission line, whereby two independent and isolated signal paths for $f_1$ and $f_2$ are respectively provided by said triaxial transmission line from said transmitter channels to said respective antennas.*

* * * * *